Patented Aug. 24, 1943

2,327,375

UNITED STATES PATENT OFFICE 2,327,375

PROCESS OF ISOLATING CHORIONIC SUBSTANCES

Erwin Schwenk and Gerhard A. Fleischer, Montclair, N. J., assignors to Schering Corporation, Bloomfield, N. J., a corporation of New Jersey No Drawing. Application October 18, 1939, Serial No. 299,978

7 Claims. (Cl. 167—74)

This invention relates to a process of isolating a chorionic substance in a highly purified state and particularly relates to a process of isolating a chorionic substance, that stimulates luteinizing and the growth of follicles, from mammalian sources such as placenta, the blood and blood serum of pregnant women and the blood and blood serum of pregnant mares.

It was shown, as early as 1927, that the gonad-stimulating hormone of the anterior lobe of the hypophysis is found in the blood of pregnant women beginning with approximately the first month of pregnancy. Shortly thereafter it was further disclosed that the same hormone is found in the male and female germinal glands, in the placenta and in the blood of pregnant mammals, for instance, women and mares. This principle has been referred to by a number of different names, more generally as the anterior pituitary-like substance and more recently as chorionic gonadotrope.

One object of the present invention is to separate a chorionic substance in a highly purified state from mammalian sources containing the same.

Another object of the invention is to separate the chorionic substance by a process involving the step of forming a plurality of liquid layers, one of which is an aqueous layer containing the substance and another of which is a gel layer containing protein type impurities in a loose molecular combination with an indifferent water-immiscible organic substance. The loose molecular combination is sufficiently stable to be centrifuged without being split into its components.

Other objects of the invention will become evident hereafter in this specification.

According to the invention, any suitable aqueous extract containing the chorionic substance is acidified to a pH at least as low as 5 and is agitated with an indifferent water-immiscible organic liquid, after which treatment the aqueous layer is separated from the plurality of layers obtained and the chorionic substance is isolated from the aqueous layer by any suitable well known procedure.

By the term "indifferent water-immiscible organic liquids," reference is made to substantially neutral organic water-immiscible liquids capable of forming a phase surface of contact with water and of forming a gel with proteins. In terms of weight to volume percentage, the solubility of the water-immiscible liquids should preferably be not less than about .5% and not more than about 10%, although somewhat higher solubilities may be found to be satisfactory so long as the organic liquid forms a distinctly separate layer with water. Suitable liquids of this type are chloroform, methylene chloride, cyclohexanone, amyl alcohol, dichloro-ethylene and ethylene chloride or mixtures of these, such as chloroform and amyl alcohol.

In the preferred embodiment of the invention, pregnant mammal blood serum containing the chorionic substance is treated in a known manner to produce an aqueous extract. The resulting liquid extract is adjusted to a pH at least as low as 5 and preferably at least as low as 4 and is agitated with about one-half its volume of an indifferent water-immiscible organic liquid in the presence of an amount of salt sufficient to create the particular electrical charge necessary to the formation of a gel but insufficient to interfere with the subsequent separation of the resulting plurality of layers. The aqueous layer containing the chorionic substance is separated and the treatment with chloroform repeated at least once prior to isolation of the chorionic substance from the aqueous layer.

The following examples are intended for purposes of better illustrating the invention.

Example 1

1.2 kg. of an acetone dried serum powder, derived from the plasma of pregnant mares, is extracted for five hours with 6 liters of water and a sufficient amount of 20% sodium hydroxide to make the pH 8.5. After whizzing the whole in a centrifuge for one-half hour, the solution is decanted from the insolubles and is promptly chilled to a temperature at least as low as about 20° C. The residue, remaining from the decantation, is extracted further three more times using approximately 4 liters of water and an hour period of extraction each time. Each aqueous extract is separated from the insolubles and chilled as in the case of the first extract and then all four extracts are combined and adjusted to a pH of 3.8 to 4.0 by addition of sufficient acetic acid. The combined extract is agitated for 2½ hours with one-half its volume of chloroform and 300 cc. of amyl alcohol and the whole is permitted to stand for a period of some hours at a temperature at least as low as about 20° C.

The upper water layer, containing the chorionic substance, is separated from the resulting chloroform gel layer by centrifuging and decanting. Sufficient 20% sodium hydroxide solution is immediately added to adjust the aqueous layer to a pH of about 6, such layer being chilled to a temperature at least as low as about 20° C.

The separated chloroform layer, consisting of a gel and a liquid chloroform phase, is agitated for one hour with 3 liters of water, 30 ccs. of amyl alcohol and 50 cc. of a 30% sodium sulphate solution to remove any chorionic substance retained in the chloroform layer. After centrifuging and decantation, the water layer is combined with the water layer previously separated to give a combined volume of about 18 liters on the average. About 97–99% of the proteins present in the aqueous extract are removed in this one chloroform treatment. This substantially complete removal of proteins in one treatment contrasts sharply with the only partial removal one obtains with chloroform under non-acid conditions.

The combined water layer is treated with 5½ times its volume of denatured alcohol (10% acetone) and 1% sodium acetate calculated for the total volume and the pH is adjusted to about 6.5, if necessary. A precipitate, containing the chorionic substance among other things, results. After a period of some hours to permit the precipitate to settle, the supernatant alcohol is decanted from the settlement and the settlement is centrifuged. The solids, obtained from the centrifuging, are stirred with acetone, filtered by suction, and dried with acetone and ether. Finally the solids are dried in a desiccator over sulphuric acid. The solids weigh about 100 grams and contain about 83% of the activity of the starting material. On the other hand, the material insoluble in the extraction step with the aqueous alkaline solution weighs about 750 to 850 grams in the dried condition and retains about 10% of the starting physiological activity. The chloroform gel after drying, weighs around 180 grams and contains about 2% or less of the starting activity. The dried fraction containing the chorionic substance, also contains 90 to 95% of sodium sulphate, indicating that the protein has been removed to an extent of 97 to 99% in one chloroform treatment. This sodium sulphate is removed to a large extent by a standard dialysis treatment performed on an aqueous solution of the fraction using a regenerated cellulose film tubing; a small amount of salt is purposely retained however for the subsequent second chloroform treatment.

After dialysis the solution is adjusted to a pH of 3.8 to 4 by the addition of a suitable amount of acetic acid, and the acidified solution is agitated for two hours with one-half its volume of chloroform and some amyl alcohol—20 cc. per liter of solution. After centrifugal separation and decantation from the chloroform layer, the water layer is neutralized to a pH of 6, while the separated chloroform and gel layer is agitated once more with 250 cc. of water for about one hour. The separated water layers are finally combined and at a pH of about 6 are treated with six times their volume of alcohol in the presence of 2% of solid sodium acetate calculated for the total volume.

After allowing sufficient time for settling and coagulation the resulting precipitate is separated by centrifuging and filtering. The dried precipitate weighs about 5 to 6 grams and possesses an activity of around 6,000 Evans units if the starting material exhibited about 30 Evans units per gram. 98% of the physiological activity present in the first fraction is recovered in this second chloroform treatment.

The fraction, obtained from the second chloroform treatment is again treated as before only on a smaller scale; in other words, is dialyzed and agitated once more with chloroform. Instead of precipitating the combined water layers with alcohol, the precipitation is performed in two steps. In the step of precipitation, the pH of the combined water layers is first adjusted to 7.5 to 8 and 1.73 volumes of 95% alcohol are added together with 2.5% of sodium acetate calculated for the total volume of the liquid. A precipitate results, which after settling (at a temperature at least as low as about 20° C.) for some hours, is separated by centrifuging. The clear supernatant liquid does not give an additional precipitate when more sodium acetate is added and is carefully kept at a temperature at least as low as about 20° C. The separated precipitate is washed twice with 60% alcohol in which 2½% of sodium acetate has been dissolved. After centrifuging, the washings thus obtained, are combined with the first supernatant solution.

In the second step of precipitation, the combined solutions recovered from the first precipitation, are adjusted to a pH of 6 by the addition of a suitable amount of acetic acid and two volumes of alcohol and 1% of sodium acetate calculated for the total volume are added. After standing at a temperature at least as low as about 20° C. for several hours, the resulting precipitate is centrifuged off, washed several times with alcohol and dried with acetone and ether. The chorionic substance, which is thus obtained in a substantially pure state, exhibits an activity of around 130,000 Evans units per gram. The chorionic substance is substantially white, odorless, tasteless, completely soluble in 60% ethyl alcohol containing 2½% sodium acetate, in 60% acetone and in water-miscible organic liquids generally, insoluble in chloroform, diethyl ether, petroleum ether, forms no precipitate with picric acid or basic lead acetate, gives a negative test for proteins with sulphosalicylic acid, and analogous protein reagents, and gives no reaction for cystine. The chorionic substance is essentially free from proteins even of the serum mucoid type, and upon administration to humans is free from any anaphylactic action even in doses of 100 Evans units. The chorionic substance exhibits a definite absorption spectrum but has no sharp melting point. Chemically the substance contains about 9.8% nitrogen and resembles more a serum mucoid type of protein than a true protein. Apparently there is present in the molecular structure a protein group, hexose-amine groups, hexose groups and acetyl groups. The ratio of hexose-amine-nitrogen to total nitrogen is about 1:12.3. Apparently a hexose-amine group is linked to a hexose group and on the basis of the entire molecule there are apparently two acetyl groups present in the hexose-amine groups. These two acetyl groups may or may not be linked to hexose-amine groups only and one of the acetyl groups may or may not be attached to the amino group of the hexose-amine.

*Example 2*

21.5 grams of fresh mare's placentae, containing a total physiological activity of 4,300 r. u., were thoroughly reduced to a subdivided state and extracted by agitating with 215 cc. of water at a pH of 8.5 (sodium hydroxide), for a period of three hours. After decantation of the resulting aqueous extract, the placentae were further extracted twice with 107 cc. of water for a period of three hours each time.

The aqueous extracts were combined and adjusted to a pH of about 3.9 by addition of a sufficient quantity of 2 normal sulfuric acid. The acidic extract is shaken for two hours with an equal volume of ethylene chloride. A gel forms with the ethylene chloride. After centrifuging, the water layer is separated from the gel and/or ethylene chloride layer, and after neutralization with 20% sodium hydroxide, six times its volume of alcohol, containing a small percentage of sodium acetate, is added, to form a precipitate containing the chorionic substance. The precipitate and liquid are immediately brought to a temperature at least as low as about 20° C. and after standing for some time the precipitate is separated and dried in a similar manner as outlined in Example 1, to yield 500 milligrams of material, assaying 8,000 r. u. per gram.

The dried product is placed with 2 cc. of water in a small regenerated cellulose tube and dialyzed against running water for twelve hours. After the dialysis purification, six times its volume of alcohol containing a small quantity of sodium acetate is added to the solution to precipitate the chorionic substance. The yield is about 45 milligrams of a white powder, assaying 82,000 r. u. per gram. If the treatment with ethylene chloride is performed at least twice and the precipitation with alcohol controlled as in Example 1, a product of the type and character set forth in Example 1 is produced.

Example 3

500 cc. of pregnant women's serum, assaying 5,000 units and containing 1% sodium citrate, were adjusted to a pH of 3.9 by addition of a sufficient amount of acetic acid and shaken for one hour with 500 cc. of chloroform and 20 cc. of cyclohexanone. A gel precipitate forms with the chloroform. After centrifuging, the water layer is separated from the chloroform layer and gel by decantation and is filtered. Six times its volume of alcohol, containing a small quantity of sodium acetate, is added to the filtrate and the whole immediately brought to a temperature at least as low as 20° C. After standing for several hours, the clear supernatant liquid is decanted from the resulting precipitate, which is thereafter centrifuged. After being dried with the aid of an acetone and ether treatment, the weight of the product, containing the chorionic substance, is found to be 178 mg., assaying a total of 4,800 units or, on a gram basis, a physiological activity of 27,000 units.

The product thus obtained, is dissolved in 5 cc. of water, the pH is adjusted to 3.8, and the acidic solution is shaken with 5 cc. of chloroform. After centrifuging, the aqueous layer is separated from the chloroform layer and/or gel and 30 cc. of alcohol, containing a small quantity of sodium acetate, is added to precipitate the chorionic substance. After standing for several hours at a temperature at least as low as 20° C., the precipitate is separated by centrifuging and is dried in a desiccator. The dried chorionic substance weighs 45 milligrams and exhibits a physiological activity of 90,000 units per gram.

Example 4

21.5 liters of plasma of pregnant mares are adjusted to pH 3.75 by means of acetic acid and a solution of 100 grams of sodium sulfate in 300 cc. of water is added. This mixture is shaken for two hours with 10.75 liters of chloroform and 400 cc. of amyl alcohol. After centrifuging, the water layer of about 12 liters is separated from the gel and chloroform layer and lowered to a temperature of at least about 20° C. The gel, including the liquid chloroform phase, is shaken twice, each time with 12 liters of water in which 60 grams of sodium sulfate have been dissolved. All three water layers are then combined and neutralized to pH 6 to 7 by means of 20% sodium hydroxide. This neutralization is not necessary, though it eliminates somewhat the danger of the hormone becoming decomposed. The combined solutions are treated with five to six times their volume of alcohol and the resulting precipitate is allowed to settle for at least several hours at a temperature of about 20° C. before siphoning off the supernatant liquid and centrifuging the residue. The residue is then treated with acetone and dried on a filter with the aid of an ether-acetone wash. The weight of the residue is approximately 200 grams, more than 90% of it being salt.

The residue thus obtained, is extracted with 1000 cc. of water. After centrifuging off the supernatant liquid, which is set aside and kept at a temperature lower than about 20° C., the residue is re-extracted for two more times with 200 cc. of water each time. The residue is then discarded. The first extraction is chilled with an ice and salt mixture until a large amount of sodium sulfate has crystallized. This salt fraction is separated either by filtration or by centrifugation. It is washed with a little ice-cold water and then discarded. The mother liquor is now combined with the above described two other extractions and the combined solutions are dialyzed through a Cellophane membrane at low temperature. It is not desirable to remove all salts as a small amount of about 4 grams is necessary for the next step. The dialyzed solution is precipitated with six times its volume of alcohol and some sodium acetate. This precipitate is worked up as usual and weighs about 10 grams.

This fraction is dissolved in 50 cc. of water and the pH is adjusted to 3.7 by means of acetic acid. Then it is shaken for 1 to 2 hours with 50 cc. of chloroform and a little amyl alcohol. After centrifuging, the water solution is set aside and kept at a temperature of about 20° C., while the chloroform layer including the gel is shaken for ½ hour with 50 cc. of 1% sodium sulfate solution. About 2 grams of inactive protein are removed by this step. The water solutions are combined, neutralized and treated with six times their volume of alcohol plus some sodium acetate. The resulting precipitate, amounting to about 8 grams, is redissolved in 60 cc. of water and dialyzed as completely as possible (dialysis can also be performed without precipitating and redissolving). After the dialysis has been concluded, the solution is taken out of the inner tube and its pH is adjusted to 7.5–8. Alcohol is added to make a concentration of 60%. To this about 2.5% of sodium acetate are added, causing a precipitation. This is separated by centrifuging and is re-extracted at least once more with 60% alcohol containing a small quantity of sodium acetate. The residue can be discarded as it does not contain any appreciable amounts of hormone. The combined solutions which are water-clear, are precipitated with 1½ parts of alcohol and are allowed to settle at a temperature at least as low as 20° C. for several hours. The precipitate is worked up in the usual manner and yields 1.38 grams of a product assaying 56,500 r. u. per gram, that is, a total of 78,000 r. u.

The activity of the starting plasma was found to be 3.7 r. u. per cc., or a total of 79,500. This indicates that our process yields 98% of the starting activity.

Various raw materials containing the chorionic substance may be utilized in the process of the invention. Dependent upon the particular raw material chosen, the starting material may be subjected to a suitable preliminary treatment prior to extraction with an aqueous solution. Suitable pre-treatments include grinding, removal of excess salts, freezing to disrupt granular and cellular tissue, mild evaporation and concentration, preliminary extractions and precipitations, etc.

In the extraction with an aqueous solution, one employs preferably a solution of an inorganic base, for intsance, sodium or potassium hydroxide, sodium or potassium carbonate, ammonium hydroxide, lithium hydroxide, and barium hydroxide. However, solutions of pyridine, trimethylamine, urea, and other nitrogen bases as well as acids such as acetic, dilute phosphoric and lactic may also be used. The agitation with the water-immiscible liquid or the formation of the gel is performed with at least sufficient violence to form an emulsion momentarily with the aqueous extract. It is important that the pH of the aqueous extract be adjusted to at least as low as 5 and preferably lower than 4 before agitation with the water-immiscible liquid. If the pH is much lower than 3, the other conditions such as temperature, are preferably kept mild. The adjustment of the pH may be accomplished by any other known methods, for instance, by the addition of an organic acid, such as acetic, or by the addition of a suitable acid salt. During any further subsequent treatments with water-immiscible liquids, the pH is desirably maintained at the same value.

It is essential that the volume of the aqueous extract be not much greater than twice the volume of the water-immiscible liquid employed for the gel formation. It is desirable therefore to reduce the volume of the aqueous solution prior to the second and any other later treatments with the water-immiscible liquid. Such reduction in volume may be accomplished in any suitable manner, for instance, either by evaporation or by precipitation of the chorionic substance followed by re-solution in a limited amount of water. Simultaneously with the reduction in volume of the aqueous layer, it is essential that the concentration of salt present be decreased so as to prevent interference with separation of the layers in the later treatment with the water immiscible liquids. If a sufficient volume of water-immiscible liquid is employed for the gel formation, three layers are formed, one being the aqueous layer containing the chorionic substance, another being the water-immiscible layer, and another being a layer of gel precipitate consisting presumably of a loose molecular aggregation of the water-immiscible liquid with the true proteins. The gel precipitate may be separated in any of the conventional ways, for instance, centrifuging, decantation, filtration, etc. It will be noted that this treatment with the water-immiscible liquid is a separation procedure involving the removal of the protein impurities in the form of a gel and is in no way an extraction procedure with respect to the chorionic substance.

After the treatment with the water-immiscible liquid, such as chloroform, the serum mucoids remaining may be removed from the aqueous layer and the chorionic substance isolated by any conventional procedure such as described in British Patent No. 313,923, Example 1, line 68 et seq., and in British Patent No. 336,471, page 1, line 21 et seq. Preferably, however, one proceeds in the following manner:

Before precipittaion of the serum mucoids and the like, the aqueous layer is preferably adjusted to a pH of about 6 to 9 and a large volume of neutral organic water-miscible liquid saturated with a suitable salt is brought in contact to cause precipitation of the serum mucoids without causing precipitation of the chorionic substance. If the organic water-miscible liquid precipitant is alcohol or acetone, a sufficient amount is introduced to give a concentration in the final liquor of about 45–70% of either alcohol or acetone and preferably about 60–65%. The precise amount of the water-miscible liquid precipitant necessary is dependent somewhat upon the precise pH of the aqueous layer containing the serum mucoids and the chorionic substance. Suitable neutral organic liquids are ethyl alcohol, methyl alcohol, propyl alcohol, tertiary butyl alcohol, acetone, ethylene glycol and other water-miscible organic liquids well known to every chemist. The salt employed with the neutral organic water-miscible liquid as well as the salt employed in the prior treatment with water-immiscible liquids, may be, for instance, sodium acetate, sodium sulfate, sodium chloride, potassium acetate, potassium sulfate, potassium chloride, lithium acetate, lithium chloride, magnesium acetate, magnesium chloride, ammonium acetate, ammonium chloride, ammonium sulfate, calcium chloride, etc. An amount of ¼–5% of the salt is generally sufficient for saturation of the water-miscible liquid chosen as precipitant.

After separating off the resulting precipitate of serum mucoids, the chorionic substance is precipitated by increasing the concentration of the neutral organic water-miscible liquid such as acetone or alcohol to at least about 75–80% or more of the total liquid at the pH 7–8; the precipitate obtained, containing the chorionic substance and about 85–90% salt, is preferably subjected to a dialysis treatment in a regenerated cellulose film membrane or the like.

The process of the invention has many advantages. From a practical standpoint, a relatively pure chorionic substance may now be isolated from raw materials containing as little as .01% of chorionic substance. That the product obtained by the process is relatively pure and substantially free from uncombined proteins, is shown by the fact that even in doses of 100 Evans units or more no antigenic reactions are encountered in human administration. An Evans unit is defined in the American Journal of Physiology 100, 144 (1932) as the amount which causes a five-fold increase in the weight of the ovaries of a rat when injected subcutaneously three times a day for two days, the animals being killed at the end of an over-all period of 96 hours.

Having described the invention in detail, we claim the following:

1. A process for preparing a chorionic substance adapted to luteinize and cause growth of follicles and substantially free from anaphylactic action, comprising extracting with an aqueous liquid, raw materials containing the same together with protein matter, adjusting the pH value of the aqueous extract to at least as low as 5, treating the resulting aqueous extract with an organic water immiscible liquid to form a gel with the protein matter, and separating the aqueous layer containing the chorionic substance from the gel precipitate obtained.

2. A process of preparing a chorionic substance adapted to luteinize and cause growth of follicles and substantially free from anaphylactic action, comprising extracting with an aqueous liquid, raw materials containing the same together with protein matter, treating the resulting aqueous extract with chloroform to form a gel at a pH value no higher than about 5, and separating the aqueous layer containing the chorionic substance from the gel precipitate obtained.

3. A process for the manufacture of a chorionic substance substantially free from protein material, comprising adjusting the pH of an aqueous solution of such substance containing protein matter, to at least as low as 5, treating the resulting acidic solution with an organic water-immiscible liquid capable of forming a precipitate with the protein matter, separating the aqueous layer containing the chorionic substance, treating the aqueous layer with a neutral water-miscible organic liquid saturated with a salt and in an amount sufficient to precipitate the mucoid-type proteins but insufficient to precipitate the chorionic substance, said amount being of a magnitude to bring the concentration of the organic liquid in the mixture within the range of 45-70%, separating the liquid from the precipitate, and treating the liquid with a further volume of neutral water-miscible liquid to precipitate the chorionic substance.

4. The method according to claim 3, wherein the precipitated chorionic principle is freed from salt by a dialysis treatment.

5. A process for the manufacture of a chorionic substance substantially free from protein material, comprising treating an aqueous solution of such substance containing protein matter at a pH value no higher than about 5 with an organic water-immiscible liquid capable of forming a precipitate with proteins, separating the aqueous layer containing the chorionic substance from the precipitate and subjecting the separated aqueous layer to at least one more treatment with a water-immiscible liquid.

6. A process for the manufacture of a chorionic substance substantially free from protein material, comprising treating an aqueous solution of such substance containing protein matter at a pH value no higher than about 5 with an organic water-immiscible liquid capable of forming a precipitate with proteins, and in the presence of a soluble salt to form a gel precipitate, and separating the aqueous layer containing the chorionic substance from the gel precipitate obtained.

7. A process of preparing a chorionic substance substantially free from anaphylactic action, comprising extracting with an aqueous liquid, raw materials containing the same together with protein matter, adjusting the pH value of the aqueous extract to at least as low as 5, treating the resulting acidic extract with an organic water-immiscible liquid capable of forming a precipitate with the protein matter, separating the aqueous layer containing the chorionic principle, precipitating mucoid-type protein from the separated aqueous layer by treatment with a sufficient amount of neutral water-miscible organic liquid to give a concentration of about 45-70% in the treated liquor at a pH value of about 6-9, separating the liquid from the precipitate obtained, and treating the separated liquid with a further volume of neutral water-miscible organic liquid to precipitate the chorionic substance.

ERWIN SCHWENK.
GERHARD A. FLEISCHER.